Patented May 9, 1933

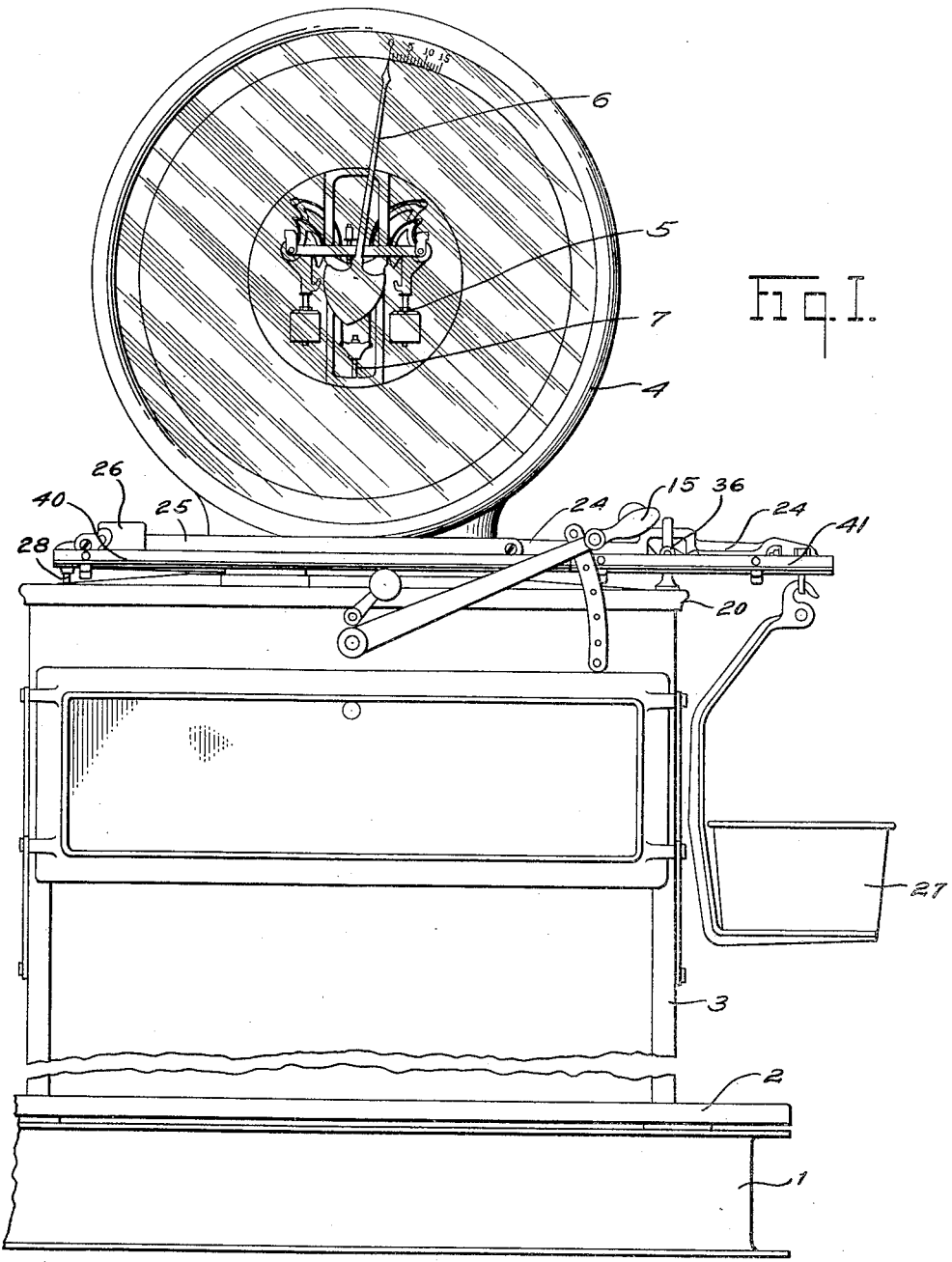
Fig. I.

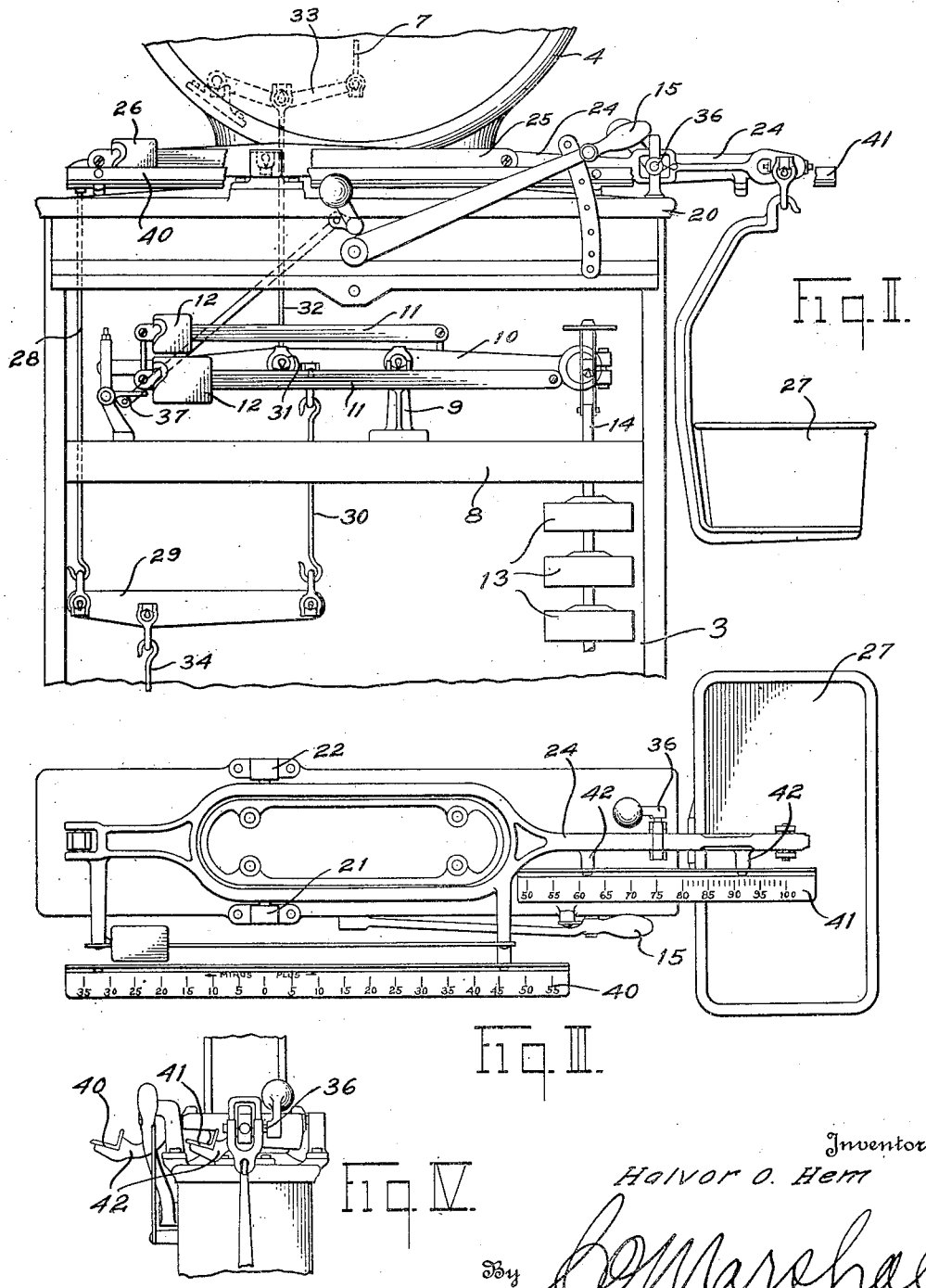

1,908,350

UNITED STATES PATENT OFFICE

HALVOR O. HEM, OF TOLEDO, OHIO, ASSIGNOR TO TOLEDO SCALE MANUFACTURING COMPANY, OF TOLEDO, OHIO, A CORPORATION OF NEW JERSEY

COMBINED WEIGHING AND COUNTING SCALE

Application filed June 30, 1927. Serial No. 202,528.

This invention relates to scales, and has for its principal object the provision of a scale which may be used for either weighing or counting or for both weighing and counting at the same time.

Another object of the invention is the provision of a counting scale of the ratio type, wherein means is provided for accurately counting the odd pieces.

Another object is the provision of a scale which may be used either for weighing or for counting, in which the mechanism used for weighing is unaffected by the setting of counterpoises, etc. on the mechanism used for counting, and vice versa.

A further object is the provision of simple means for counting articles which may be incorporated into a weighing scale without necessitating extensive changes in the weighing mechanism.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a weighing scale embodying my invention;

Figure II is a fragmentary view showing the lever mechanism thereof;

Figure III is a top plan view showing the counting beam of the scale and the upper end of the cabinet which supports the counting beam;

Figure IV is a fragmentary end elevational view of a portion of the scale shown in Figure II.

Referring to the drawings in detail, the base 1 of the scale houses and supports the platform levers (not shown) which in turn support the platform 2. A cabinet 3 is erected upon the rear of the base and is surmounted by a substantially watch-case-shaped head 4 which houses automatic load-counterbalancing mechanism 5, a link 7 extending from the automatic load-counterbalancing mechanism downwardly into the cabinet 3.

Supported within the cabinet 3 is a shelf 8 upon which is mounted a fulcrum bracket 9 which supports a lever 10. The lever 10 is formed with suitable projections providing supports for beams 11 properly equipped with poises 12.

In the scale shown the normal weighing capacity is adapted to be increased by means of a plurality of unit weights 13 which may be brought into co-operation with a rod 14 depending from one end of the lever 10 by means of an operating handle 15. As this mechanism forms no part of the present invention, I have not shown it in exacting detail.

Mounted upon the top plate 20 of the cabinet 3 are fulcrum brackets 21 and 22 which support a lever 24, the lever being open and surrounding the neck of the head 4. The lever 24 is equipped with a tare beam 25 and poise 26 and also a specimen pan 27 supported upon one end of the lever. The other end of the lever is connected by means of a link 28 to one end of a lever 29, which in turn is connected at its other end by means of a link 30 to the lever 10 and through a stirrup 31 to a link 32. The link 32 is connected to a supplemental lever 33 suitably fulcrumed within the head 4, the lever also being connected to the lower end of the link 7.

The lever 29 is connected at a point intermediate its points of connection with the levers 10 and 24 to the platform lever mechanism (not shown) by means of a steelyard rod 34. When a load is placed upon the platform 2 the resulting pull on the steelyard rod 34 is transmitted through the link 28 to the counting lever 24.

If the counting lever be locked by means of the lever locking device 36 the link 28 will act merely as a fulcrum support for the lever 29 and the pull will be transmitted through the link 30 to the weighing lever 10. If the weighing lever 10 be locked by means of the lever locking device 37 the link 30 will act as a fulcrum support for the lever 29 and the pull will be transmitted through the link 28 to the counting lever 24. Since movement from the platform levers may be transmitted through the lever 29 either to the counting lever or the weighing dial, the lever 29 and the parts linking it to the counting lever and weighing dial constitute a differential connection. The device may thus be used either as a counting or a weighing scale.

When it is used as a counting scale one or more specimens of the lot of articles to be counted is placed in the specimen pan 27. If the multiplication of the lever mechanism between the specimen pan and the platform 2 is 100, it will take 100 articles on the platform to balance the counting lever 24 with one article in the specimen pan. By this method it is possible to count, for example, 2000 parts very rapidly by placing the required number of similar articles in the specimen pan—in this case, 20 articles to balance the bulk of articles upon the platform. In event, however, that the bulk of articles upon the platform 2 is not a multiple of 100, it would be necessary to add to or subtract articles from the bulk until a condition of balance was obtained. For example, if 2045 parts were placed upon the platform 2 it would be necessary to place 20 articles in the specimen pan and count out of the bulk of articles the 45 odd parts which must be added to the count in the specimen pan multiplied by the factor 100. In order to eliminate this time-consuming hand counting operation I have equipped the counting lever 24 with a pair of trough-like bars 40 and 41 carried in forwardly projecting portions 42 of the lever 24. The substantially horizontal portions of the bars 40 and 41 are suitably graduated, the zero graduation being in a vertical plane passing through the fulcrum of the lever 24 and the graduation characterized 100 being in a vertical plane passing through the pivot supporting the specimen pan 27. Thus it will be apparent that in counting 2045 articles on the platform, 20 articles should be placed in the specimen pan 27 and one article moved along the bar 40 until the lever 24 is properly balanced. In this case the article will be directly positioned on the graduation marked 45, thus indicating to the operator that there are 45 odd pieces on the platform which must be added to the number of articles counterbalanced by those in the specimen pan in order to ascertain the total number of articles upon the scale platform. It will be obvious that the bars 40 and 41 could be combined in one bar as far as the counting operation is concerned. However, a continuous bar would inconvenience the scale operator in manipulating the weight operating handle 15.

If an article is positioned to the left of the zero graduation on the bar 40 in order to obtain a balance of the counting lever, the number of parts indicated must be subtracted from the bulk of articles to obtain the proper count. It is to be understood that the counting lever mechanism may be of any desired multiplication, and the graduations on the bars 40 and 41 must conform to the lever multiple.

If articles to be counted are placed in a box or other container, the container may be counterbalanced by means of the tare poise 26 on the beam 25.

If when a load is placed on the scale the weighing lever 10 and the counting lever 24 are both unlocked, the weight of the load will be automatically indicated on the dial by the indicator 6 and the count of the load may also be taken by means of the lever 24. If a container is used its weight may be counterbalanced independently on the beam 25 for the counting mechanism and on the beams 11 for the weighing mechanism.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a commodity-receiver, weighing mechanism including an automatically indicating chart and index, counting mechanism, including a freely movable lever, a differential connection between said weighing mechanism and counting mechanism and said commodity-receiver, and means carried by said lever to support an article as a counter at different distances from its fulcrum pivot.

2. In a device of the class described, in combination, a commodity-receiver, weighing mechanism including an automatically indicating chart and index, counting mechanism, including a freely movable lever, means connecting said weighing mechanism and counting mechanism to said commodity-receiver whereby a load on said commodity-receiver independently acts upon said weighing mechanism and counting mechanism, and means carried by said counting lever at a distance from its pivot to receive articles as counters, said lever having means to support an article as a counter at different distances from its fulcrum.

3. In a device of the class described, in combination, a commodity-receiver, weighing mechanism including an automatically indicating chart and index, counting mechanism including a lever, an intermediate lever, means connecting one end of said intermediate lever to said weighing mechanism, means connecting the other end of said intermediate lever to said counting lever, means connecting said intermediate lever to said commodity-receiver, means carried by said counting lever at a distance from its pivot to receive articles as counters, and means on said lever adapted to support an article as a counter at different distances from its fulcrum.

4. In a device of the class described, in combination, a commodity-receiver, weighing mechanism including an automatically indicating chart and index, counting mechanism including a lever, and an intermediate lever, said intermediate lever being connected at an intermediate point to said commodity-receiver and having its ends connected respectively to said weighing mechanism and said counting lever, said counting lever having means adapted to support an article as a counter at different distances from its fulcrum pivot.

5. In a device of the class described, in combination, a commodity-receiver, weighing mechanism, counting mechanism including a lever, an intermediate lever, said intermediate lever being connected at an intermediate point to said commodity-receiver and having its ends connected respectively to said weighing mechanism and said counting lever, and means carried by said counting lever at a distance from its pivot to receive articles as counters, said counting lever having additional means to support an article as a counter at an infinite plurality of different distances from its fulcrum.

6. In a device of the class described, in combination, a commodity-receiver, weighing mechanism, counting mechanism including a counting lever, means connecting said weighing mechanism and said counting mechanism to said commodity-receiver, and means including a smooth graduated bar carried by said counting lever for receiving an article as a counter at innumerable different distances from the fulcrum of the counting lever.

7. In a device of the class described, in combination, a commodity-receiver, weighing mechanism, counting mechanism including a counting lever, means connecting said weighing mechanism and counting mechanism to said commodity-receiver whereby a load on said commodity-receiver independently acts on said weighing mechanism and said counting mechanism, means including a receptacle supported by said counting lever at a distance from its fulcrum adapted to receive articles as counters, and means including a graduated bar carried by said counting lever to support an article as a counter at different distances from its fulcrum pivot.

8. In a device of the class described, in combination, a commodity-receiver, counting mechanism including a counting lever, means connected to said commodity-receiver and said counting lever, and means supported upon said counting lever comprising a trough-like receptacle adapted to support an article as a counter at different distances from the fulcrum pivot of said lever.

9. In a device of the class described, in combination, a commodity-receiver, counting mechanism including a counting lever, connections between said commodity-receiver and said counting lever, a receptacle carried by said counting lever at a fixed distance from its fulcrum and adapted to receive articles as counters, and means carried by said counting lever comprising a trough-like receptacle to support an article as a counter at different distances from the fulcrum of said lever.

10. In a device of the class described, in combination, a commodity-receiver, counting mechanism including a counting lever, connections between said commodity-receiver and said counting lever, a receptacle carried by said counting lever at a fixed distance from its fulcrum and adapted to receive articles as counters, and means carried by said counting lever comprising a longitudinally extending trough-like receptacle to support an article as a counter at different distances from the fulcrum of said lever, said trough-like receptacle bearing a series of graduations to indicate the position of the article carried thereby.

HALVOR O. HEM.